(No Model.)
W. T. BOSTICK.
MOSQUITO BAR FRAME.
No. 248,910. Patented Nov. 1, 1881.
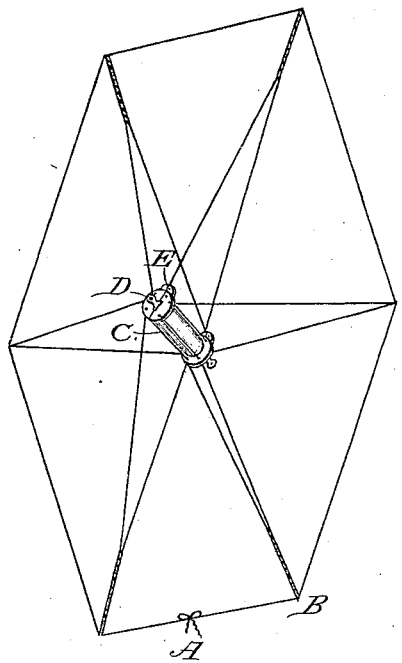
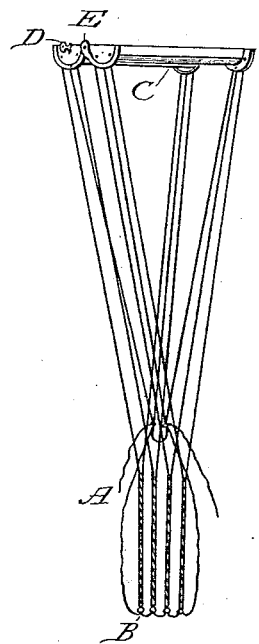

UNITED STATES PATENT OFFICE.

WILLIAM T. BOSTICK, OF AUSTIN, TEXAS.

MOSQUITO-BAR FRAME.

SPECIFICATION forming part of Letters Patent No. 248,910, dated November 1, 1881.

Application filed May 16, 1881. (No model.)

*To all whom it may concern:*

Be it known that I, WILLIAM T. BOSTICK, of Austin, Travis county, Texas, have invented a new Improvement in Mosquito-Bar Frames, of which the following is a specification.

My invention relates to improvements in mosquito-bar frames in which wire is used instead of wood. The wire being twice bent at right angles, and the ends twisted or fastened together and connected in a suitable manner to a center piece, it forms a very strong and light frame. The two side wires being soldered or fastened to each half of center piece prevents its turning. The center piece, being in halves and hinged together, admits, when the cord is untied, of being folded together, so as to occupy a very small space, and renders it quite convenient for transportation. It may be fastened overhead, or by connection with a suitable arm it can be fastened to the bedstead.

In diagram, Figures 1 and 2 represent the frame opened and closed.

A is the ends of the cord, by tying or untying of which the frame is opened or closed; B, the twisted ends of the arms; C, the center piece; D, the eye in the end of center piece for suspending the frame. E shows the hinges or center piece so as to admit of the opening or closing the frame.

I claim—

1. The mosquito-bar frames formed of two or more arms of wire bent twice at right angles and the ends being twisted or fastened together by other means, and connected to the center in a suitable manner.

2. The combination of one or more arms bent in a triangular form with the ends soldered or fastened to each half of the center piece to prevent it turning.

3. The ends of the arms twisted and fastened together for several inches from the ends, whereby great strength is given to the arm.

4. The combination, in a mosquito-bar frame, of a center piece with holes and eyes for the arms, which, being in two pieces and hinged together, admits of the frame being folded together laterally.

W. T. BOSTICK.

Witnesses:
JAY ANDREWS,
B. F. WRIGHT.